July 26, 1966  R. J. SMULAND  3,262,635
TURBOMACHINE SEALING MEANS
Filed Nov. 6, 1964  2 Sheets-Sheet 1
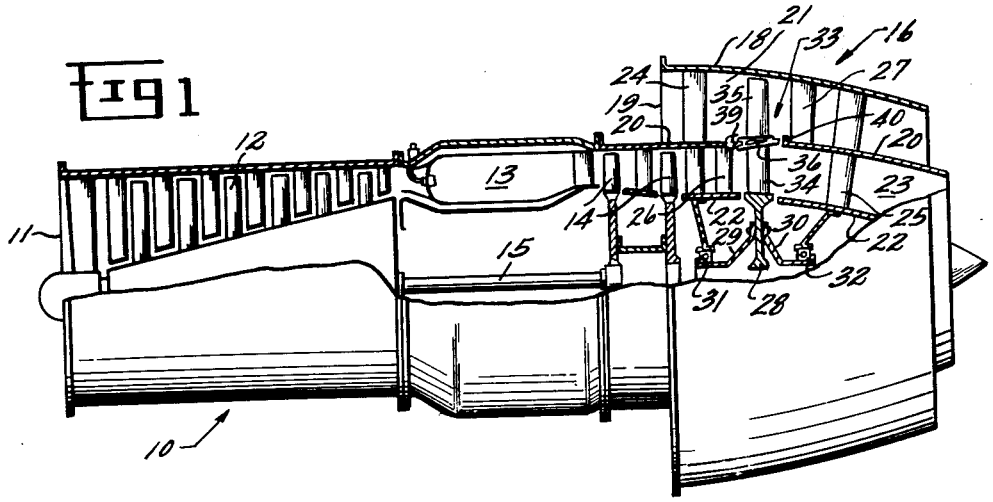
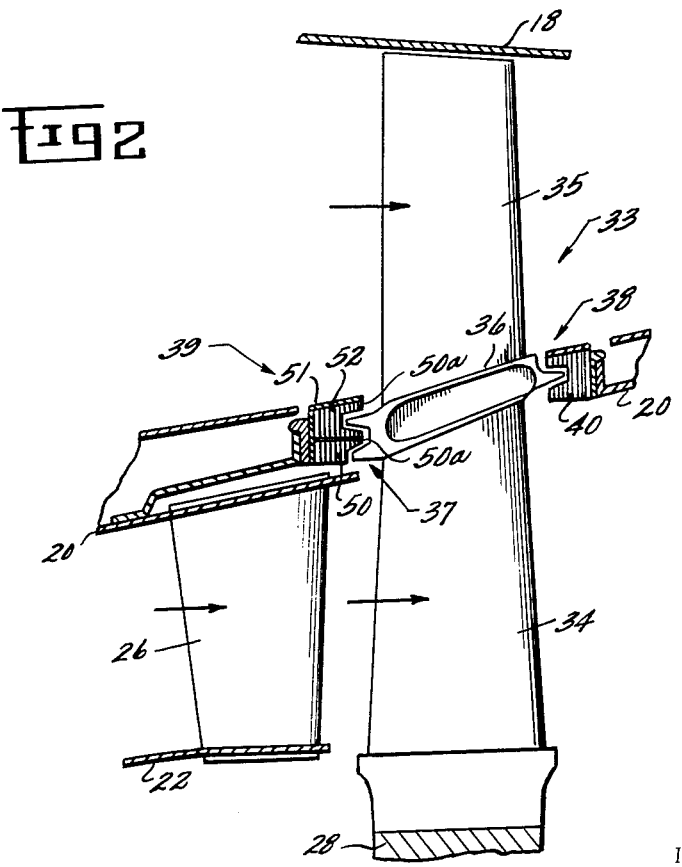
INVENTOR.
ROBERT J. SMULAND
BY
George R. Powers
ATTORNEY

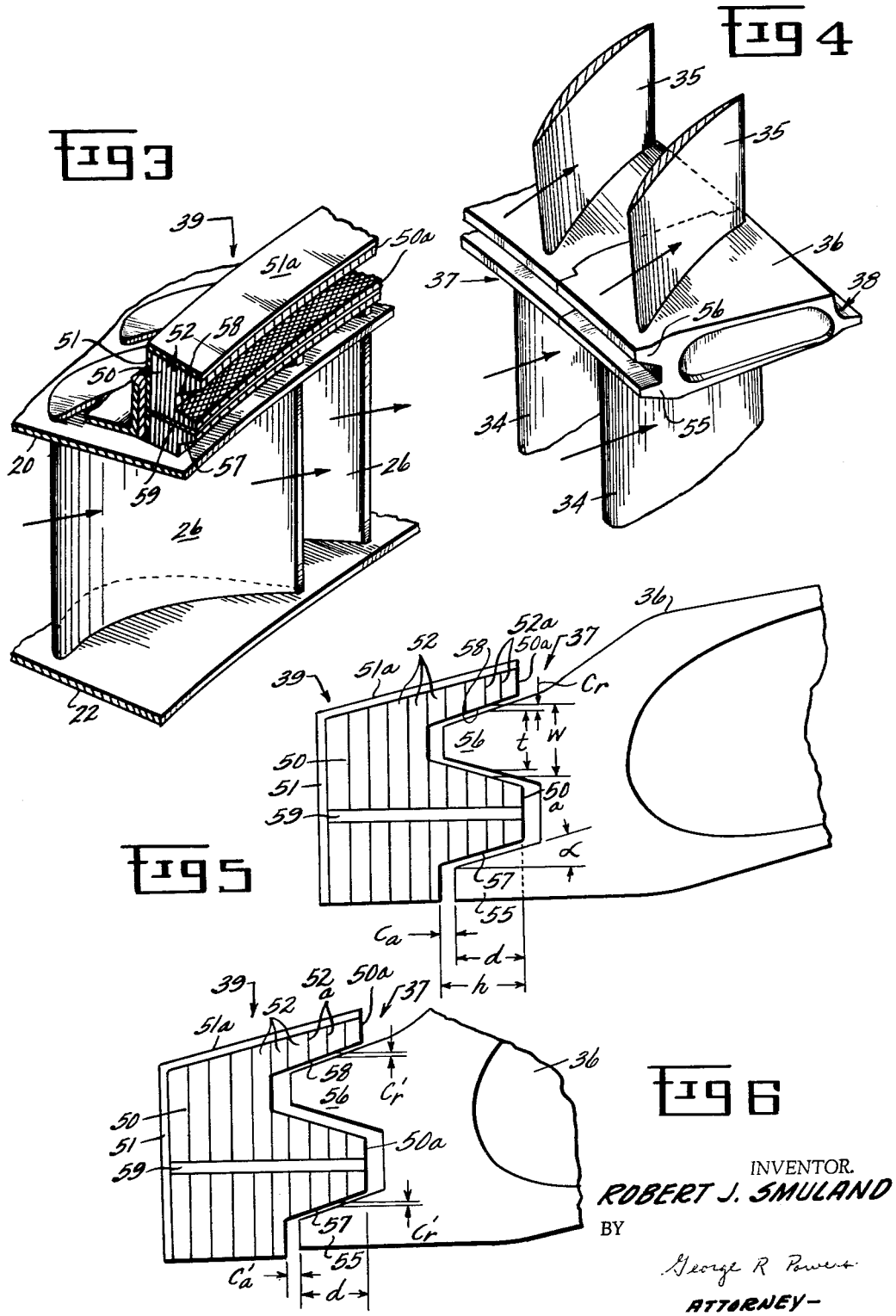

United States Patent Office 3,262,635
Patented July 26, 1966

3,262,635
TURBOMACHINE SEALING MEANS
Robert J. Smuland, Reading, Mass., assignor to General Electric Company, a corporation of New York
Filed Nov. 6, 1964, Ser. No. 409,405
11 Claims. (Cl. 230—116)

This invention relates to sealing means for turbomachines and, more particularly, to sealing means for preventing leakage between the concentric fluid passageways of gas turbine engines of the bypass type.

In bypass gas turbine engines and especially in aft-fan engines, there is a tendency for radial leakage to occur outwardly from the inner stream of high pressure, high temperature combustion products to the concentric outer stream of relatively low pressure, low temperature bypass air at the point where the rotor spans the concentric passageways. The performance, including output thrust and efficiency, of the engine will be noticeably reduced in the event that this leakage is permitted to reach a substantial level. It is therefore desirable to provide effective sealing means for preventing this radial leakage. In practice, however, it is difficult to provide such a sealing means. The problems encountered will be best appreciated by considering the environmental conditions in which the sealing means must operate. As stated above, the inner stream of combustion products is at high temperature and pressure while the outer stream of bypass air is at esentially atmospheric conditions. It therefore will be readily appreciated that substantial thermal expansion transients are typically encountered during engine operation, these transients occurring in both the axial and radial directions with respect to the engine axis. Relative movement between the stationary and rotating engine structures can also be caused by factors other than temperature. As examples of these latter factors, loads resulting from unusual aircraft maneuvers and shifting of bearing clearances may cause deflections and relative movement between engine elements. It has been found in practice that movement resulting from these factors is generally more pronounced in the axial direction than in the radial direction, and it has also been found that this type of relative movement is less uniform, predictable, and controllable than that associated with thermal expansion and contraction. In addition, axial tolerances between turbomachine elements are rather difficult to hold during assembly.

To prevent undesired radial leakage between the concentric streams of fluid, seals of the labyrinth type have been used. These seals typically require close-running axial clearances in order to accomplish satisfactory sealing. As a result, it is necessary to use extremely accurate assembly techniques which are expensive and time consuming in order to provide acceptably small axial seal clearances at the time of assembly. Even when this is done, however, the various factors discussed above may adversely affect the axial seal clearances during turbomachine operation and cause disadvantageously high leakage. This is especially true in engines which have experienced excessive deflections resulting from unusual aircraft maneuvers or other causes and in engines having enlarged bearing clearances resulting primarily from wear.

It is therefore an object of this invetnion to provide improved sealing means for more effectively preventing radial leakage between concentric stream of fluids having different pressures.

Another object of this invention is to provide in a bypass gas turbine engine improved sealing means for preventing radial leakage between axially spaced rotating and stationary elements.

A further object of this invention is to provide in a bypass gas turbine engine effective sealing means not requiring extremely close axial clearances for preventing radial leakage between concentric streams of high pressure combustion products and low pressure bypass air.

A still further object is to provide in a bypass gas turbine engine having concentric fluid passageways improved sealing means for preventing radial leakage between the passageways, the sealing means providing acceptably low leakage without requiring unusual or excessively accurate assembly techniques.

In carrying out the invention in one form, a bypass gas turbine engine having concentric passageways for high pressure combustion products and low pressure bypass air is provided with an improved sealing means for preventing radial leakage from one of the passageways to the other through the axial space between the stationary engine structure and a rotor assembly spanning the concentric passageways. The sealing means is comprised of an annular honeycomb member mounted on either the turbomachine rotor or the stator and at least one axially projecting circular seal tooth carried on the other turbomachine element. The honeycomb member has at least one continuous circular groove formed therein for receiving the continuous seal tooth, the seal tooth and the groove being coaxial. The groove is disposed such that its axial depth is perpendicular to the radial axes of the individual cells comprising the honeycomb, and the seal tooth extends axially into the groove in close running radial clearance thereto a distance equal to at least two diameters of the honeycomb cells.

Other objects and advantages of this invention will be readily understood and appreciated by reference to the following detailed description when considered in connection with the accompanying drawing, in which:

FIG. 1 is a sectional view of an aft-fan engine utilizing the present invention;

FIG. 2 is a view on a larger scale of the sealing assembly of the present invention illustrating its relationship to the other components of the fan type engine;

FIG. 3 is a pictorial view of the annular honeycomb ring structure;

FIG. 4 is a pictorial view of the rotor assembly showing the concentric seal teeth mounted thereon;

FIG. 5 is a detailed view of the sealing assembly showing the relative assembled positions of the elements comprising the present invention; and FIG. 6 is a view similar to FIG. 5 illustrating the relative positions of the elements during steady state operation of the augmenter.

The present invention is particularly suited for preventing radial leakage between the concentric flow passages of gas turbine engines of the bypass type, an aft-fan engine 10 utilizing the invention being shown by FIG. 1. The engine 10 includes a gas generator comprised of an inlet 11, an axial flow compressor 12, a combustor 13, and a gas generator turbine 14. The gas generator turbine 14 is driven by combustion products discharged from the combustor 13, and the turbine 14 in turn drives the compressor 12 through a shaft 15. A turbo augmenter 16, or aft fan, is mounted axially downstream of the gas generator and comprises a power turbine and a fan in a single rotor assembly. As shown, the static structure of the turbo augmenter 16 includes a cylindrical outer casing or wall 18 which encloses the entire assemblage and provides an inlet 19 for bypass or secondary air; a cylindrical intermediate wall 20 divided into fore and aft sections and separating the bypass air passages 21 from the turbine exhaust gases; and a cylindrical inner wall 22 formed in two sections which defines the inner boundary of the turbine exhaust passage 23. The three walls are connected by radial struts 24 and 25 and by vanes 26 and 27 which serve as turbine nozzle and fan outlet guide members, respectively.

As best shown by FIGS. 2–5, the rotating structure of the turbo augmenter 16 comprises a single stage rotor which includes a rotor wheel 28 connected to fore and aft stub shafts 29 and 30 supported in bearings 31 and 32, respectively. The bearings are in turn attached to the sections of the inner wall 22 and are thus carried by the stationary structure of the augmenter. A plurality of dual airfoils 33 are mounted on the periphery of the rotor wheel 28 in circumferentially spaced relationship, the airfoils 33 extending radially outward from the wheel 28 across both the turbine exhaust passageway 23 defined by the walls 20 and 22 and the secondary air passageway 21 defined by walls 18 and 20. Each dual airfoil 33 includes a turbine bucket 34 and a compressor blade 35 joined in radial relationship with respect to the rotor wheel axis by means of a mid-platform 36 formed integrally with the bucket 34 and the blade 35. If the rotor assembly is viewed as an integral structure rather than merely as a group of dual airfoils 33 having interlocking platforms 36, it can be described as comprising a rotor wheel 28 having a row of turbine buckets 34 peripherally mounted thereon, a peripheral platform 36 mounted on the outer tips of the turbine buckets, and a row of compressor blades 35 peripherally mounted on the platform and extending outwardly therefrom across the bypass air passageway 21. The leading and trailing edges of the platform 36 are serrated to form circumferentially continuous teeth indicated generally by numerals 37 and 38, respectively, for cooperating with fixed sealing members indicated generally by numerals 39 and 40, respectively, carried by the cylindrical sections of the intermediate wall 20 to prevent radial leakage of gases from one passageway into the other.

The present invention resides in the novel configuration and orientation of these last-mentioned sealing elements which cooperate in accordance with the invention to provide extremely effective sealing between the mid-platform 36 and the two sections of the intermediate wall 20. Reference is now directed to FIGS. 2–5 where the representative set of sealing elements 37 and 39 is illustrated in greater detail. The other set of sealing elements 38 and 40 could, of course, be discussed if desired; it will be obvious that the following comments are applicable to either set of sealing elements. The fixed sealing member 39 comprises an annular ring 50 of honeycomb material mounted on a metal backing member 51 which is in turn secured to the forward section of the cylindrical intermediate wall 20 by conventional fastening means not illustrated. The honeycomb or cellular construction of the honeycomb material is preferably of the general type described in United States Patent 2,963,307 to Bobo, issued December 6, 1960, and assigned to the assignee of the present invention. It should be noted at this point that the ring 50 of honeycomb material is mounted such that it is coaxial with the axis of the rotor wheel 28 and such that it has a radial face 50a adjacent the platforms 36 of the dual airfoils 33. In order to provide the novel sealing capabilities of the present invention, the individual cells 52 comprising the honeycomb ring 50 are disposed such that their axes are radial with respect to the axis of the rotor wheel 28.

With reference still being directed to FIGS. 2–5, the teeth indicated generally by 37 are comprised of individual concentric seal teeth 55 and 56 projecting axially from the mid-platform 36 into grooves 57 and 58, respectively, axially machined into the radial face 50a of the annular ring 50. Since the individual cells 52 are disposed radially and the grooves 57 and 58 are each coaxial with the axis of the rotor wheel 28, it will be obvious that the grooves 57 and 58 cut through the individual cells 52 at right angles to the cell axes. As shown best by FIG. 5, the grooves 57 and 58 cut through several rows of the cells 42, and the seal teeth 45 and 46 extend into the grooves an axial distance $d$. It is desirable that this distance should be at least equal to and preferably greater than twice the diameter of the individual cells, and in the illustrated embodiment the distance is equal to four times the diameter of the individual cells. To facilitate assembly of the turbo augmenter, it is, of course, essential that the axial depth $h$ of the grooves be greater than the distance $d$ so that there will not be binding between the teeth 55 and 56 and the respective grooves 57 and 58 when assembling the elements. Consequently, a normal axial clearance $Ca$ will be formed between the seal tooth and the bottom of the groove. In accordance with the present invention, this clearance $Ca$ can be relatively large without having a significant effect on the radial leakage during turbo augmenter operation. The reason for this will become apparent as this specification proceeds. Similarly, in order to facilitate assembly, the grooves should have radial widths greater than the radial thicknesses of the seal teeth at corresponding axial locations on each, the width $w$ and the thickness $t$ shown by FIG. 5 being illustrative. Accordingly, there is a normal radial clearance between each of the teeth and the walls of the associated grooves, the radial clearances $Cr$ being illustrative. Furthermore, the walls of both the seal teeth 55 and 56 and the grooves 57 and 58 should be of substantially cylindrical configuration so that relative axial movement between the teeth and the grooves will have no substantial effect on the radial clearances. It is recognized, of course, that in practice there will generally be some taper to the walls as illustrated; however, in practice the angle $\alpha$ should be as small as possible, the size of the angle $\alpha$ being exaggerated in FIG. 5 for the purposes of illustration. A cylindrical baffle 59 is provided in the annular ring 50 intermediate the concentric grooves 57 and 58 to block the cells 52 connecting the two grooves, the baffle 59 thereby preventing the direct passage of fluid from one of the grooves to the other through the individual cells 52. Similarly, the backing member 51 has a generally cylindrical portion 51a for preventing leakage from the groove 58 to the outer passageway 21.

The operation of the sealing means of this invention will now be described. When the gas turbine engine is not in use, the members comprising the turbo augmenter are in the relative positions illustrated by FIGS. 1, 2, and 5. More particularly, the seal teeth and the grooves have suitable axial and radial assembly clearances therebetween as described above. Once the turbo augmenter is placed in operation, however, the elements will expand in both the radial and axial directions in response to the increasing temperature. The relative positions of the elements will also change simultaneously in response to other factors of the type discussed above, these changes typically being greatest in the axial direction. As a result, the net effect on the axial clearance $Ca$ between the seal teeth 55 and 56 and the respective grooves 57 and 58 is not completely predictable from engine to engine and may not even be uniform from time to time on the same engine. On the other hand, these factors contribute little to the relative radial positions of the elements and thus have little net effect on the radial assembly clearances $Cr$, changes in which are determined almost entirely by the amount of relative thermal expansion in the radial direction. Since thermal expansion and contraction is well understood and may be described accurately by means of mathematics, the amount of relative movement in the radial direction may be predicted with relative accuracy prior to operating an engine and is generally uniform from time to time in the same engine. In addition to being predictable and relatively uniform, this radial expansion and contraction can be controlled by state-of-the-art techniques such as the use of cooling air in controlled quantities, insulation, and heat shields. In accordance with the present invention, these and similar devices are used to control the relative expansion and contraction of the augmenter elements such that the rotor assembly expands at a greater rate than the static structure to completely close the assembly clearance $Cr$ between the radially outward walls of the seal teeth 55 and 56 and the corresponding walls of the grooves 57 and 58. In fact, it is desirable for the total expansion of the rotor assembly to be sufficiently great to more than close the initial clearance so that the teeth 55 and 56 "rub-in" to the honeycombing during initial engine operation 40, the result being extremely close radial running clearances $Cr'$. The relative positions of the various elements during steady state operating conditions is illustrated by FIG. 6.

With attention being directed to FIG. 6, it will be seen that the extremely small running clearance $Cr'$ results in an axial labyrinth seal being formed along the outer wall of each of the seal teeth 55 and 56 where the radial partitions 52a forming the cells 52 extend into proximity to the wall. To be effective as a labyrinth seal, the teeth preferably extend, as described previously, into the grooves 57 and 58 a distance $d$ at least equal to two cell diameters so that at least two rows of the partitions are in proximity to the tooth wall. In addition to this axial labyrinth between the cells 52 and the walls of the teeth, it will be seen that the grooves 57 and 58 in the honeycomb ring 50 and the seal teeth 55 and 56 co-operate to form an interlocking radial labyrinth. In other words, the teeth on the rotor by their extension into the grooves in the honeycomb material result in the radial path across the seal being a labyrinth. It can thus be seen that in accordance with the present invention axial labyrinth seals are superimposed on a radial labyrinth seal. This composite seal for preventing radial leakage from the inner passageway 23 defined by the walls 20 and 22 to the outer passageway 21 defined by the walls 18 and 20 may be described as being a double labyrinth seal. It will, of course, be appreciated by those skilled in the art that for optimum results the axial running clearances $Ca'$ between the seal teeth 55 and 56 and the grooves 57 and 58 should be as small as possible. However, in the event that these clearances during operation are greater than desired, the radial leakage will still not be excessive because of the small radial clearances $Cr'$ and the associated axial labyrinths.

Many variations of the basic invention will occur to those skilled in the art. As one example, it would be obvious to use the invention to provide a double labyrinth seal for preventing axial leakage in applications where the transients in the radial direction are relatively greater than those in the axial direction.

From the foregoing, it will be appreciated that the sealing means of the present invention effectively prevents radial leakage between the concentric streams of high pressure combustion products and low pressure bypass air is bypass gas turbine engines, particularly aft-fan engines, at the point where the fan rotor assembly spans the two streams. The radial leakage is effectively prevented even when the axial transients between the static and rotatable elements of the turbo augmenter are relatively large or unpredictable.

While particular embodiments of the invention have been shown and described, it will be understood that various changes and modifications may be made without departing from the spirit and scope of the invention, and it is intended to cover all such changes and modifications by the appended claims.

What is claimed as new and desired to secure by Letters Patent of the United States is:

1. In a turbomachine rotor assembly having a rotor member mounted for rotation about an axis and a stator member adjacent said rotor member, sealing means comprising:
    (a) an annular honeycomb member mounted on one of said rotor and stator members,
    (b) said annular honeycomb member having at least one continuous groove therein, the depth of said groove being perpendicular to the axes of the individual cells comprising said honeycomb member,
    (c) and at least one continuous seal tooth on the other of said rotor and stator members projecting therefrom into said continuous groove in said honeycomb member in proximity to the walls thereof,
    (d) whereby a double laybrinth seal is formed to effectively seal between said rotor member and said stator member.

2. Sealing means as defined by claim 1 in which the axial depth of said groove and the axial height of said seal tooth are such that tooth projects into said groove a distance at least equal to twice the diameter of the individual cells comprising the honeycomb member.

3. In a turbomachine rotor assembly, sealing means comprising:
    (a) a rotor member mounted for rotation about an axis,
    (b) a stator member in axially spaced relationship to said rotor member,
    (c) an annular honeycomb member mounted on said stator member, said honeycomb member having a radially disposed face adjacent said rotor member,
    (d) the individual cells comprising the honeycomb member being disposed such that the axes of the cells are radial,
    (e) at least one continuous circular groove coaxial with said rotor member in the radial face of said honeycomb member, the axial depth of said groove being greater than twice the diameter of the individual cells,
    (f) and at least one continuous circular seal tooth on said rotor member projecting axially therefrom into said groove in proximity to the walls thereof an axial distance at least equal to twice the diameter of the individual cells and less than the depth of said groove, thereby forming a seal between said rotor member and said stator member.

4. Sealing means for use in a turbomachine rotor assembly comprising:
    (a) a rotor member mounted for rotation about an axis,
    (b) a stator member in axially spaced relationship to said rotor member,
    (c) an annular honeycomb member mounted on said stator member, said honeycomb member having a radially disposed face adjacent said rotor member,
    (d) the individual cells comprising the honeycomb member being disposed such that the axes of the cells are radial,
    (e) a plurality of concentric grooves coaxial with said rotor member in the radial face of said honeycomb member, the axial depth of said grooves being greater than twice the diameter of the individual cells,
    (f) and a plurailty of concentric seal teeth on said rotor member each projecting axially therefrom into a respective one of said grooves in proximity to the walls thereof an axial distance at least equal to twice the diameter of the individual cells and less than the depth of said respective groove,
    (g) whereby a double labyrinth seal is formed to effectively seal between said rotor member and said stator member.

5. Sealing means as defined by claim 4 in which both the sides of said teeth and the walls of said grooves are of substantially cylindrical configuration.

6. Sealing means as defined by claim 5 in which the thermal expansion of the rotor member in the radial direction as the turbomachine approaches the steady state operating temperature is sufficiently greater than that of the stator member to move the radially outer wall of the teeth outwardly to close the running clearance between said walls and the corresponding walls of the respective grooves.

7. In a turbomachine having a rotor wheel mounted for rotation about the turbomachine axis, a first row of airfoil-shaped vanes peripherally mounted on said rotor wheel, a peripheral platform mounted on the outer tips of the first row of vanes, a second row of airfoil-shaped vanes peripherally mounted on said platform and extending outwardly therefrom, and stationary stator structure defining concentric inner and outer fluid passageways for supplying fluid to said first and second rows of vanes, said stator structure including a substantially cylindrical member intermediate said passageways radially aligned with and in axially spaced relationship to said platform, sealing means comprising:

(a) an annular honeycomb member mounted on said cylindrical member, said honeycomb member having a radially disposed face adjacent said platform, (b) the individual cells comprising the honeycomb member being disposed such that the axes of the cells are radial, (c) at least one circular groove coaxial with the turbomachine axis in the radial face of said honeycomb member, the axial depth of said groove being greater than twice the diameter of the individual cells, (d) at least one circular seal tooth on said platform projecting axially therefrom into said groove in proximity to the walls thereof an axial distance at least equal to twice the diameter of the individual cells and less than the depth of said groove, (e) whereby a double labyrinth seal is formed to prevent leakage of fluid from one to the other of said passageways between said platform and said cylindrical member.

8. In an aft-fan gas turbine engine having a rotor wheel mounted for rotation about the engine axis, a row of turbine buckets peripherally mounted on said rotor wheel, a peripheral platform mounted on the outer tips of said turbine buckets, a row of compressor blades peripherally mounted on said platform and extending outwardly therefrom, and stationary stator structure defining concentric inner and outer fluid passageways for supplying respectively combustion gases to said turbine buckets and bypass air to said compressor blades, said stator structure including a substantially cylindrical member intermediate said passageways radially aligned with and in axially spaced relationship to said platform; sealing means comprising:

(a) an annular honeycomb member mounted on said cylindrical member, said honeycomb member having a radially disposed face adjacent said platform, (b) the individual cells comprising the honeycomb member being disposed such that the axes of the cells are radial, (c) a plurality of concentric grooves coaxial with the engine axis in the radial face of said honeycomb member, the axial depth of said grooves being greater than twice the diameter of the individual cells, (d) and a plurality of concentric seal teeth on said platform each projecting axially therefrom into a respective one of said grooves in proximity to the walls thereof an axial distance at least equal to twice the diameter of the individual cells and less than the depth of said respective grooves, (e) whereby a double labyrinth seal is formed to prevent leakage of high pressure, high temperature combustion gases from the inner passageway outwardly between said platform and said cylindrical member to the outer passageway.

9. Sealing means as defined by claim 8 in which means is provided intermediate adjacent grooves to block the individual cells connecting said grooves to prevent flow therethrough.

10. Sealing means as defined by claim 9 in which both the sides of said teeth and the walls of said grooves are of substantially cylindrical configuration and in which the thermal expansion of the rotor wheel in the radial direction as the turbomachine approaches the steady state operating temperature is sufficiently greater than that of the stator structure to move the radially outer walls of the teeth outwardly to close the running clearance between said walls and the corresponding walls of the respective grooves.

11. In fluid handling apparatus having stationary structure defining concentric inner and outer fluid passageways, said stator structure including a substantially cylindrical member intermediate said passageways, and a member mounted for rotation radially spanning said inner and outer passageways in axially spaced relationship to said cylindrical member, sealing means comprising:

(a) an annular honeycomb member mounted on said cylindrical member, said honeycomb member having a radially disposed face adjacent said rotatable member, (b) the individual cells comprising the honeycomb member being disposed such that the axes of the cells are radial, (c) at least one continuous circular groove in the radial face of said honeycomb member, the axial depth of said groove being greater than twice the diameter of the individual cells, (d) and at least one continuous circular seal tooth on said rotatable member projecting axially therefrom into said groove in proximity to the walls thereof an axial distance at least equal to twice the diameter of the individual cells and less than the depth of said groove, (e) whereby a double labyrinth seal is formed to effectively seal between said inner and outer cylindrical passageways.

References Cited by the Examiner

UNITED STATES PATENTS

| | | | |
|---|---|---|---|
| 2,963,307 | 12/1960 | Bobo | 277—53 |
| 3,046,648 | 7/1962 | Kelley | 29—455 |
| 3,083,975 | 4/1963 | Kelley | 277—53 |
| 3,186,166 | 6/1965 | Grieb | 230—122 X |

ROBERT M. WALKER, *Primary Examiner.*